(12) United States Patent
Li

(10) Patent No.: US 11,431,623 B2
(45) Date of Patent: Aug. 30, 2022

(54) METHOD FOR CONFIGURING PRIVATE LINE SERVICE, DEVICE, AND STORAGE MEDIUM

(71) Applicant: Huawei Technologies Co., Ltd., Guangdong (CN)

(72) Inventor: Jiuyong Li, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/827,250

(22) Filed: Mar. 23, 2020

(65) Prior Publication Data

US 2020/0322267 A1    Oct. 8, 2020

(30) Foreign Application Priority Data

Apr. 4, 2019    (CN) .......................... 201910271841.9

(51) Int. Cl.
*H04L 45/50* (2022.01)
*H04L 12/46* (2006.01)
(Continued)

(52) U.S. Cl.
CPC .......... *H04L 45/50* (2013.01); *H04L 12/4633* (2013.01); *H04L 12/4641* (2013.01); *H04L 45/04* (2013.01); *H04L 45/66* (2013.01)

(58) Field of Classification Search
CPC ..... H04L 12/28; H04L 12/46; H04L 12/4633; H04L 12/4641; H04L 45/04; H04L 45/22; H04L 45/24; H04L 45/245; H04L 45/28; H04L 45/50; H04L 45/66; H04L 45/74; H04L 45/745; H04L 2212/00
See application file for complete search history.

(56) References Cited

U.S. PATENT DOCUMENTS 8,792,501 B1    7/2014    Rustagi et al.
2010/0182937 A1    7/2010    Bellagamba
(Continued)

FOREIGN PATENT DOCUMENTS

CN    101068139 A    11/2007
CN    101595691 A    12/2009
(Continued)

OTHER PUBLICATIONS

XP055227537 Anonymous,"Multichassis Link Aggregation Group—Knowledge Base",Feb. 9, 2012,total 6 pages.

*Primary Examiner* — Peter Chen
(74) *Attorney, Agent, or Firm* — Womble Bond Dickinson (US) LLP

(57) ABSTRACT

This application discloses a method for configuring a private line service, including: a first device that detects a state of a user side port of the first device, where the first device is an access network device directly connected to a first host that accesses the user side port of the first device and a user side port of a second device by using a multi-chassis link bundling technology, the second device is an access network device directly connected to the first host, the first device is different from the second device. When the user side port of the first device is in a usable state, the first device removes a port of a peer-link of the first device from a broadcast domain, where the peer-link connects the first device and the second device.

20 Claims, 6 Drawing Sheets

(51) Int. Cl.
    *H04L 45/02*         (2022.01)
    *H04L 45/00*         (2022.01)

(56) References Cited

U.S. PATENT DOCUMENTS

| | | | |
|---|---|---|---|
| 2012/0033541 A1* | 2/2012 | Jacob Da Silva | H04L 45/586 370/217 |
| 2015/0124643 A1* | 5/2015 | Pani | H04L 61/6004 370/254 |
| 2016/0036728 A1 | 2/2016 | Duda | |
| 2016/0149751 A1* | 5/2016 | Pani | H04L 45/245 370/221 |
| 2017/0085469 A1 | 3/2017 | Chu et al. | |
| 2017/0257309 A1 | 9/2017 | Appanna | |
| 2019/0044887 A1* | 2/2019 | Cai | H04L 45/245 |
| 2019/0149359 A1* | 5/2019 | Nakagawa | H04L 47/41 370/401 |
| 2019/0182202 A1* | 6/2019 | Garcia Del Rio | H04L 45/28 |

FOREIGN PATENT DOCUMENTS

| | | |
|---|---|---|
| CN | 101631035 A | 1/2010 |
| CN | 102142948 A | 8/2011 |
| CN | 102185784 A | 9/2011 |
| CN | 106878047 A | 6/2017 |
| EP | 2127233 B1 | 10/2011 |
| EP | 2533474 A1 | 12/2012 |

\* cited by examiner

METHOD FOR CONFIGURING PRIVATE LINE SERVICE, DEVICE, AND STORAGE MEDIUM

CROSS REFERENCE TO RELATED APPLICATIONS

This application claims the benefit of Chinese Application No. 201910271841.9 filed on Apr. 4, 2019, the disclosure of which is incorporated herein by reference.

TECHNICAL FIELD

This application relates to the field of communications technologies, and in particular, to a method for configuring a private line service.

BACKGROUND

A multi-chassis link aggregation group (M-LAG) is a mechanism that implements multi-chassis link aggregation, and can implement link aggregation among a plurality of devices, so that link reliability is improved from a board level to a device level, and a dual-active system is formed. The M-LAG may be applied to dual-homing access of a virtual extensible local area network (VXLAN), to provide traffic load balancing and backup protection.

A private line service is a point-to-point service. A VXLAN private line service supports a remote private line service mode and a local private line service mode. FIG. 1 is a schematic diagram of networking in which a user dual homing accesses a remote private line service by using an M-LAG. As shown in FIG. 1, in the VXLAN network, a process in which a host 1 sends traffic to network side is that the traffic sent by the host 1 enters a VXLAN access device (such as a leaf 1) through a user side port U1, the leaf 1 duplicates the traffic to a network side port N1, and in case port N1 is faulty, the leaf 1 duplicates the traffic to a peer-link port, that is, to a port P1, so that when the port N1 is faulty, the traffic can be transmitted to the network side through a port N2. The peer-link is a direct link between the leaf 1 and a leaf 2, and is used for exchange of negotiation packet and transmission of some traffic. A process in which the network side sends traffic to a user side is that the traffic sent from the network side enters the leaf 1 through the port N1, the leaf 1 duplicates the traffic to the port U1, and in case the port U1 is faulty, the leaf 1 duplicates the traffic to the port P1, so that when the port U1 is faulty, the traffic can be transmitted to the host 1 through a user side port U3.

For a private line service in the M-LAG scenario, both the traffic sent by the host 1 to the network side and the traffic sent from the network side to the host 1 are duplicated to the port P1. When private line traffic is relatively heavy, traffic on the port P1 is excessively heavy, restricting deployment of the private line service.

SUMMARY

Embodiments of this application provide a method for configuring a private line service. When a user side port of a first device is in a usable state, a port of a peer-link of the first device is removed from a broadcast domain, so that traffic on the port of the peer-link is reduced, and deployment of the private line service is optimized.

To achieve the foregoing objective, the embodiments of this application provide the following technical solutions:

According to a first aspect of this application, a method for configuring a private line service is provided. The private line service is a point-to-point service, or an end-to-end service. A VXLAN private line service supports two modes: a remote private line service mode and a local private line service mode. In the remote private line service, a layer 2 subinterface of a user side (hereinafter briefly referred to as a user side port) and a VXLAN tunnel outbound interface of a network side (hereinafter briefly referred to as a network side port) are located in a same bridge domain (BD), and the BD is a group of logical ports belonging to a same flood or broadcast domain. In the local private line service, two user side ports of a same device are located in a same BD, the local private line service means that traffic is forwarded in a point-to-point manner between two user side devices, and at most two user side ports are supported in one BD. A port may also be referred to as an interface, and in the embodiments of this application, port and interface are usually interchangeably used, but meanings of the nouns may be understood by a person skilled in the art. Therefore, in the embodiments of this application, the nouns indicate a same meaning when their distinction is not highlighted. The method may include: detecting, by a first device, a state of a user side port of the first device, where the first device is an access network device directly connected to a first host, the first host accesses the user side port of the first device and a user side port of a second device by using a multi-chassis link bundling technology, the second device is an access network device directly connected to the first host, the first device is different from the second device. When each user side port of the first device in a broadcast domain corresponding to the first host is in a usable state, the first device removes a port of a peer-link of the first device from the broadcast domain, where the peer-link connects the first device and the second device. According to the first aspect, it can be learned that in a normal case, that is, the user side port of the access network device is up, the first device or the second device removes the port of the peer-link from the broadcast domain. In this case, neither traffic sent from a user side to a network side or sent from a network side to a user side in the remote private line service, nor traffic sent from a user side to another user side in the local private line service passes through the port of the peer-link, so that traffic on the port of the peer-link is reduced, bandwidth pressure of the peer-link is reduced, and deployment of the private line service is optimized.

In one embodiment, the method may further include: when at least one user side port of the first device in the broadcast domain is in an unusable state, the first device re-adds the port of the peer-link of the first device to the broadcast domain. The peer-link connects the first device and the second device. That the first device removes a port of a peer-link of the first device from a broadcast domain means that after receiving traffic, the first device no longer sends the traffic to the port of the peer-link.

In one embodiment, the private line service is a remote private line service, and the method may further include: when a network side port of the first device is in an unusable state, configuring, by the first device, the user side port of the first device to be in an unusable state. That is, after detecting that the network side port of the first device is faulty, the first device configures an uplink port to be faulty, and shuts down access of a downlink port. Traffic from the first host to a network side is sent to a network side port of the second device through the user side port of the second device.

In one embodiment, the private line service is a remote private line service, and the method may further include:

when a network side port of the second device is in an unusable state, receiving, by the first device through the user side port of the first device, traffic sent by the first host. The first device sends, to a network side port of the first device, the received traffic sent by the first host.

In one embodiment, the private line service is a remote private line service, and the method may further include: when a network side port of the first device is in an unusable state, sending, by the first device, received traffic sent by the first host to the network side to the network side port of the second device through an escape path.

In one embodiment, the private line service is a local private line service, the user side port of the first device may include a first port and a second port, the user side port of the second device may include a third port and a fourth port, and when the first port and the second port are both in a usable state, the method may include: receiving, by the first device through the first port, traffic sent by the first host to a second host, where the first host accesses the first port and the third port by using the multi-chassis link bundling technology. The first device sends the traffic to the second host through the second port, where the second host accesses the second port and the fourth port by using the multi-chassis link bundling technology, and the traffic sent by the first host does not pass through the peer-link.

In one embodiment, the private line service is a local private line service, the user side port of the first device may include a first port and a second port, the user side port of the second device may include a third port and a fourth port, the first host accesses the first port and the third port by using the multi-chassis link bundling technology, a second host accesses the second port and the fourth port by using the multi-chassis link bundling technology, and when the first port is in a usable state and the second port is in an unusable state, the method may include: receiving, by the first device through the first port, traffic sent by the first host to the second host. The first device sends the traffic to the second host through the peer-link.

In one embodiment, the private line service is a local private line service, the user side port of the first device may include a first port and a second port, the user side port of the second device may include a third port and a fourth port, the first host accesses the first port and the third port by using the multi-chassis link bundling technology, a second host accesses the second port and the fourth port by using the multi-chassis link bundling technology, and when the first port is in an unusable state and the second port is in a usable state, the method may further include: receiving, by the first device through the second port, traffic sent by the second host to the first host. The first device sends the traffic to the third port of the second device through the peer-link.

According to a second aspect of this application, a first device is provided. The first device has function that implements the method according to the foregoing first aspect or any one of the embodiments of the first aspect. The function may be implemented by using hardware, or may be implemented by hardware by executing corresponding software. The hardware or software includes one or more modules corresponding to the foregoing function.

According to a third aspect of this application, a computer-readable storage medium is provided. Instructions are stored in the computer-readable storage medium, and when the instructions are run on a computer, the computer is enabled to perform the method for configuring a private line service according to the foregoing first aspect or any one of the embodiments of the first aspect.

According to a fourth aspect, a computer program product including instructions is provided, and when the instructions are run on a computer, the computer is enabled to perform the method for configuring a private line service according to the foregoing first aspect or any one of the embodiments of the first aspect.

According to a fifth aspect of this application, a chip system is provided. The chip system includes a processor, configured to support the first device in implementing functions related according to the foregoing first aspect or any one of the embodiments of the first aspect. In a possible design, the chip system further includes a memory. The memory is configured to store a program instruction and data that are necessary to the first device. The chip system may include a chip, or may include a chip and another discrete member.

In embodiments of this application, when the user side ports of the first device are in a usable state, the port of the peer-link of the first device is removed from the broadcast domain, so that traffic on the port of the peer-link is reduced, and deployment of the private line service is optimized.

DESCRIPTION OF EMBODIMENTS

Figure 1:
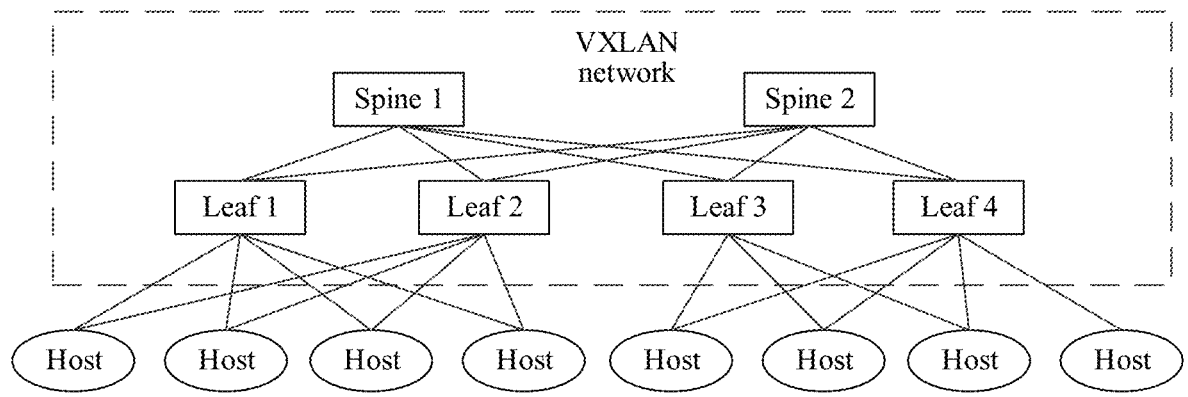
FIG. 1 is a schematic diagram of a typical networking structure in a VXLAN.

The following describes embodiments of this application with reference to the accompanying drawings. Apparently, the described embodiments are merely some but not all of the embodiments of this application. A person of ordinary skill in the art may know that as technologies evolve and a new scenario emerges, technical solutions provided in the embodiments of this application are also applicable to a similar technical problem.

The embodiments of this application provide a method for configuring a private line service, an access device, and a storage medium. A first device adds or removes, based on a state of each user side port of the first device, a port of a peer-link of the first device to or from a broadcast domain, to reduce traffic on the port of the peer-link, so that bandwidth pressure of the peer-link is reduced, and deployment of the private line service is optimized. Detailed descriptions are separately provided below.

Herein, claims, and the foregoing accompanying drawings of this application, terms "first", "second", and the like are used to distinguish between similar objects but do not necessarily be used to indicate an order or sequence. It should be understood that terms used in such a way are interchangeable in proper circumstances, so that the embodiments described herein can be implemented in another order rather than the order illustrated or described herein. In addition, the terms "include", "have" and any other variants mean to cover the non-exclusive inclusion. For example, a process, method, system, product, or device that includes a list of steps or modules is not necessarily limited to those steps or modules expressly listed, but may include another step or module not expressly listed or inherent to such a process, method, system, product, or device. Although steps in this application are named or numbered, such names or numbers are not intended to limit the time/logic order of these steps in the method procedure. The execution order of procedural steps already named or numbered can be adjusted based on a technical objective to be implemented as long as same or similar technical effects can be achieved. The module division in this application is logical division and may be another division manner during actual application. For example, multiple modules may be combined as or integrated in another system, or some features may be ignored or not performed. In addition, the displayed or discussed mutual coupling or direct coupling or communication connection may be implemented by using some ports. The indirect coupling or communication connection between the modules may be implemented in electronic or another similar form, and this is not limited in this application. In addition, modules or sub-modules described as separate components may be or may not be physically separated, or may be or may not be physical modules, or may be distributed into multiple circuit modules. Objectives of the solutions of this application may be achieved by selecting some or all of the modules based on actual requirements.

A virtual extensible local area network (VXLAN) is a technology that encapsulates a layer 2 packet with a layer 3 protocol. A principle of the VXLAN technology is: A data packet sent by a host is encapsulated in a User Datagram Protocol (UDP) packet, and an Internet Protocol (IP) address or a media access control (MAC) address both in a physical network is used as an outer header to encapsulate the UDP packet, and then transmit encapsulated UDP packet on the Internet. After the encapsulated UDP packet arrives at an objective node, the objective node decapsulates the encapsulated UDP packet, and sends decapsulated data to a target virtual machine.

A typical networking structure of the VXLAN is a spine-leaftwo-layer network topology structure. As shown in FIG. 1, a current VXLAN network includes a spine (e.g., gateway) and a leaf (e.g., VXLAN access device), and each leaf communicates with another leaf by using the spine. For clearer understanding of the spine-leaf two-layer network topology structure, the following describes related concepts:

(1) Spine device: A spine device is located at a core layer of the network architecture, and the spine device is responsible for connecting to a lower-layer leaf device and also responsible for communicating with the Internet.

(2) Leaf device: A leaf device is located at an access layer of the network architecture, one leaf device may be connected to one or more hosts (a server or a virtual machine run on a server), and the leaf device is configured to forward a communication packet between the host to which the leaf device is connected and another network unit (such as another host).

(3) Host to which the leaf device is connected: A host may be a server, or may be a virtual machine (VM) run on a server. Usually, each server can accommodate one virtual switch and a plurality of VMs.

For a data center system based on the VXLAN technology, the spine device and the leaf device can communicate with each other by using the VXLAN network. In the VXLAN network, any quantity of hosts may exist, that is, any quantity of servers may exist, and each server can accommodate any quantity of virtual switches and any quantity of VMs.

To ensure network stability and reliability of the data center, a plurality of spine devices and leaf devices are usually disposed in the network architecture for backup and error tolerance. As shown in FIG. 1, one host is connected to a plurality of leaf devices, and one leaf device is connected to a plurality of spine devices. In an operation, a multi-chassis link bundling technology may be used. M-LAG is a mechanism that implements multi-chassis link bundling, and can implement link aggregation among a plurality of devices, to improve link reliability from a board level to a device level, and form a dual-active system. The M-LAG is widely applied to dual-homing access of the VXLAN network, to provide load balancing and backup protection.

Figure 2:
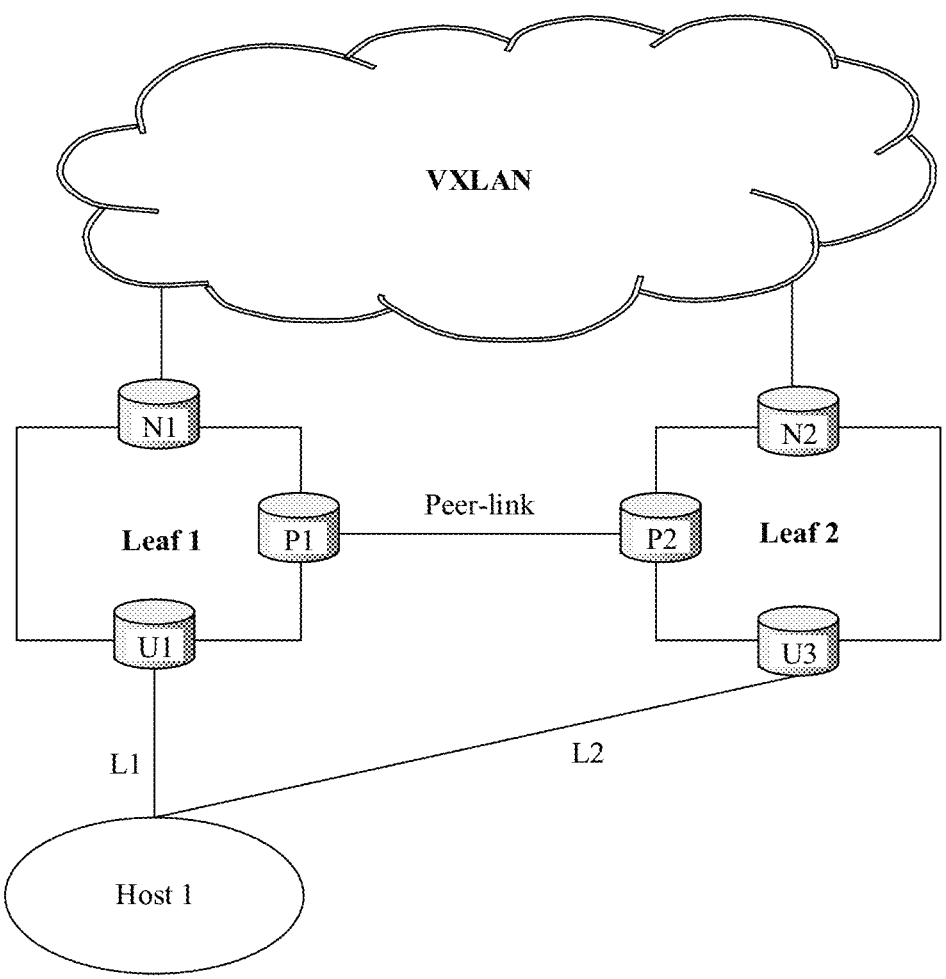
FIG. 2 is a schematic diagram of networking of a dual-homing access VXLAN remote private line service according to an embodiment of this application.
Figure 3:
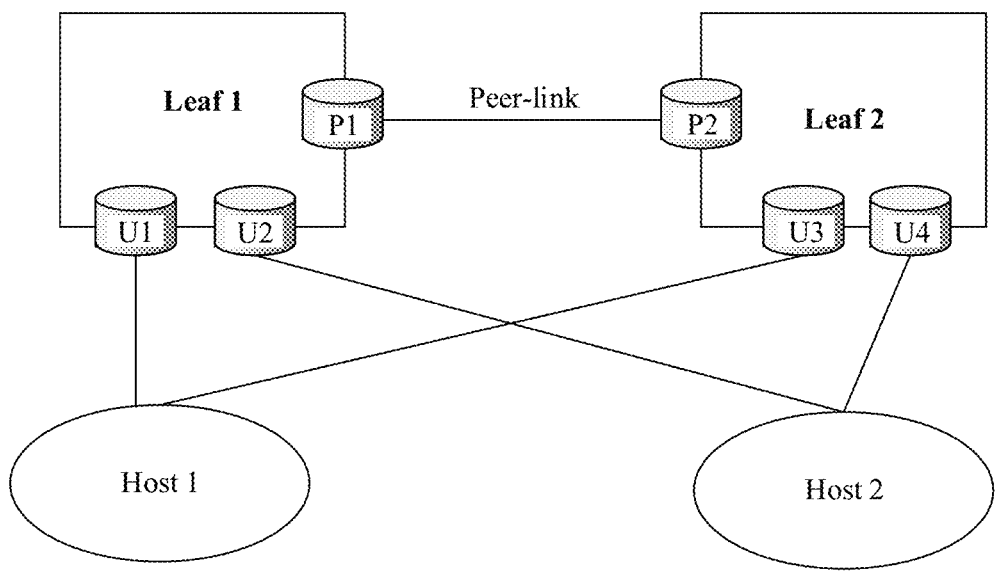
FIG. 3 is a schematic diagram of networking of a dual-homing access VXLAN local private line service according to an embodiment of this application.

A private line service is a point-to-point service, or an end-to-end service. A VXLAN private line service supports two modes: a remote private line service mode and a local private line service mode. A user side port (such as a layer 2 subinterface) and a network side port (such as a VXLAN tunnel outbound interface at a network side) are located in a same bridge domain (BD), and the BD is a group of logical ports belonging to a same flood or broadcast domain. The remote private line service means that traffic is forwarded in a point-to-point manner between one user side device and one network side device. In the remote private line service, at most one user side port and one network side port are supported in one BD. In the local private line service, two user side ports are located in a same BD, the local private line service means that traffic is forwarded in a point-to-point manner between two user side devices, and at most two user side ports are supported in one BD. A port may also be referred to as an interface, and in the embodiments of this application, port and interface are usually interchangeably used, but meanings of the nouns may be understood by a person skilled in the art. Therefore, in the embodiments of this application, the nouns indicate a same meaning when their distinction is not highlighted. To further describe the remote private line service and the local private line service of the VXLAN, FIG. 2 uses an example of two leaf devices and one host for description, and FIG. 3 uses an example of two leaf devices and two hosts for description. For clear description, FIG. 2 and FIG. 3 reserve the leaf device and the host device, and omit other parts shown in FIG. 1. FIG. 2 is a schematic diagram of networking of a single-homing access VXLAN remote private line service. In the remote private line service, one leaf device at most supports one user side port and one network side port. For example, in FIG. 2, a leaf 1 at most supports one user side port U1 and one network side port N1, and a leaf 2 at most supports one user side port U3 and one network side port N2. In the embodiments of this application, N1 and N2 are network side ports of a same VXLAN tunnel. As shown in FIG. 2, the remote private line service may mean that traffic is forwarded in a point-to-point manner among the user side ports U1 and U3 and the network side ports N1 and N2. For example, the traffic is forwarded in a point-to-point manner between U1 and N1, or the traffic is forwarded in a point-to-point manner between U3 and N1, or the traffic is forwarded in a point-to-point manner between U1 and N2, or the traffic is forwarded in a point-to-point manner between U3 and N2. FIG. 3 is a schematic diagram of networking of a single-homing access VXLAN local private line service. In the local private line service, one access network device at most supports two user side ports in one BD. For example, in FIG. 3, a leaf 1 at most supports two user side ports U1 and U2, and a leaf 2 at most supports two user side ports U3 and U4. As shown in FIG. 3, the local private line service may mean that the traffic is forwarded in a point-to-point manner between U1 and U3, or the traffic is forwarded in a point-to-point manner between U1 and U4, or the traffic is forwarded in a point-to-point manner between U2 and U3, or the traffic is forwarded in a point-to-point manner between U2 and U4.

A Virtual Router Redundancy Protocol (VRRP) is used between the leaf 1 and the leaf 2, so that a VRRP backup group is formed, to implement load balancing. From a perspective of the access device, the leaf 1 and the leaf 2 may be considered as one device, and share one virtual MAC address. A peer-link is deployed between the leaf 1 and a leaf 2, and is used for negotiation of packet exchange and transmission of some traffic. From a perspective of a layer 3 network, the leaf 1 and the leaf 2 are two independent devices, and each may support an independent gateway, and serve as an independent Open Shortest Path First (OSPF) node. The leaf 1 and the leaf 2 support local preferential forwarding. As shown in FIG. 3, after traffic sent by a host 1 to a host 2 arrives at the leaf 1, the leaf 1 preferentially sends the traffic to the host 2 through a physical link between the leaf 1 and the host 2, and the leaf 1 does not need to send the traffic to the leaf 2 through the peer-link and then the leaf 2 forwards the traffic to the host 2, so that traffic between the leaf 1 and the leaf 2 is reduced to a largest extent.

As shown in FIG. 2, in the VXLAN remote private line service, a host 1 is dual-homed to the network. A link L1 between the host 1 and the leaf 1 and a link L2 between the leaf 2 and the host 1 form a link aggregation group (LAG). Each LAG uniquely corresponds to one logical interface. The logical interface is referred to as an aggregation interface or an Eth-Trunk interface, and two aggregation interfaces together form a group of M-LAG ports. For example, as shown in FIG. 2, U1 and U3 are aggregation interfaces, and U1 and U3 together form a group of M-LAG ports. The leaf 1 and the leaf 2 establish a connection through a peer-link, and the peer-link is used for negotiation of packet exchange and transmission of some traffic. As shown in FIG. 3, in the VXLAN local private line service, the host 1 and the host 2 are both dual-homed to the network. U1 and U3 are a group of M-LAG ports, and U2 and U4 are a group of M-LAG ports. A link between the host 1 and the leaf 1 and a link between the leaf 2 and the host 1 form a first LAG.

Currently, in the dual-homing access remote private line service or the dual-homing access local private line service, during a traffic forwarding process, traffic is duplicated to the port of the peer-link in case a user side port or a network side port is faulty, resulting in excessively heavy traffic on the port of the peer-link, and restricting deployment of the private line service when private line traffic is relatively heavy. The following uses FIG. 2 and FIG. 3 as an example for description. In a scenario shown in FIG. 2, traffic sent by the host 1 to the network side may enter the leaf 1 through the user side port U1, or may enter the leaf 2 through U3. The leaf 1 duplicates the traffic to the network side port N1. In case N1 is faulty, the leaf 1 duplicates the traffic to the port of the peer-link, that is, duplicates to P1, so that when N1 is faulty, the leaf 1 can transmit the traffic to the leaf 2 through the peer-link, and the leaf 2 transmits the traffic to the network side through N2. Alternatively, if traffic sent by the host 1 to the network side enters the leaf 2 through U3, the leaf 2 duplicates the traffic to the network side port N2. In case N2 is faulty, the leaf 2 duplicates the traffic to the port of the peer-link, that is, duplicates to P2, so that when N2 is faulty, the leaf 2 can transmit the traffic to the leaf 1 through the peer-link, and the leaf 1 then transmits the traffic to the network side through N1. A process in which the network side sends traffic to the host 1 is: The traffic sent from the network side may enter the leaf 1 through N1, or may enter the leaf 2 through N2. After the traffic enters the leaf 1, the leaf 1 duplicates the traffic to U1. In case U1 is faulty, the leaf 1 duplicates the traffic to P1, so that when U1 is faulty, the leaf 1 can transmit the traffic to the leaf 2 through the peer-link. The leaf 2 transmits the traffic to the host 1 through U3. After the traffic enters the leaf 2, the leaf 2 duplicates the traffic to U3. In case U3 is faulty, the leaf 2 duplicates the traffic to P2, so that when U3 is faulty, the leaf 2 can transmit the traffic to the leaf 1 through the peer-link, and the leaf 1 then transmits the traffic to the host 1 through U1. It should be noted that a port of a multi-homing access network device and the port of the peer-link are unidirectionally isolated. That is, traffic sent by the port of the peer-link to a multi-homing port is isolated, but the multi-homing port can send traffic to the port of the peer-link. In a scenario in FIG. 2, that is, in a normal case, P1 cannot send traffic to U1, and P2 cannot send traffic to U3. When U1 is faulty, U3 is no longer a multi-homing port, and P2 can send traffic to U3.

In a scenario in FIG. 3, that is, in a normal case, P1 cannot send traffic to U1 and U2, and P2 cannot send traffic to U3 and U4. When U1 is faulty, U3 is no longer a multi-homing port, and P2 can send traffic to U3. When U3 is faulty, U1 is no longer a multi-homing port, and P1 can send traffic to U1. Similarly, when U2 is faulty, P2 can send traffic to U4, and when U4 is faulty, P1 can send traffic to U2.

In a scenario shown in FIG. 3, a process in which the host 1 sends traffic to the host 2 is: Traffic sent by the host 1 can enter the leaf 1 through U1, and the leaf 1 can directly locally forward the traffic, that is, duplicate the traffic to U2, and sends the traffic to the host 2 through U2. In case U2 is faulty, the leaf 1 duplicates the traffic to P1, so that when U2 is faulty, the leaf 1 may send the traffic to the leaf 2 through the P1 port, and the leaf 2 sends the traffic to the host 2 through U4. Similarly, a process in which the host 2 sends traffic to the host 1 is: Traffic sent by the host 2 can enter the leaf 2 through U4, and the leaf 2 can directly duplicate the traffic to P2.

The following describes the method for configuring a private line service in detail according to the embodiments of this application in two scenarios of dual-homing access VXLAN remote private line service and dual-homing access VXLAN local private line service.

Figure 4:
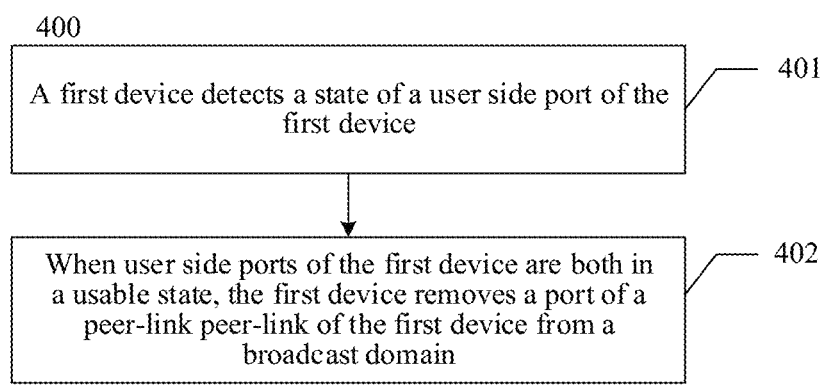
FIG. 4 is a schematic flowchart of a method 400 for configuring a private line service according to an embodiment of this application.

FIG. 4 is a schematic flowchart of a method 400 for configuring a private line service according to an embodiment of this application.

As shown in FIG. 4, the method 400 for configuring a private line service in this embodiment of this application may include the following steps:

401. A first device detects a state of a user side port of the first device.

The first device is an access network device directly connected to a first host, the first host accesses the user side port of the first device and a user side port of a second device by using a multi-chassis link bundling technology, the second device is an access network device directly connected to the first host, and the first device is different from the second device. The user side port of the first device and the user side port of the second device are located in a same bridge domain BD. The host may be a server, or may be a virtual machine (VM) run on a server. The state of the user side port includes a usable state (e.g., up) and an unusable state (e.g., down). The usable state may also be referred to as a normal state. In this embodiment of this application, the usable state and the normal state are usually interchangeably used, but meanings of the nouns may be understood by a person skilled in the art. Therefore, in this embodiment of this application, the nouns indicate a same meaning when their distinction is not highlighted. The unusable state includes a faulty state, or may include another unusable state. For example, the first device configures the user side ports to be in an unusable state. This embodiment of this application does not restrict a type of the unusable state.

The method 400 may be applicable to the scenario shown in FIG. 2 or FIG. 3. In the scenario shown in FIG. 2, the first device may be the leaf 1 or may be the leaf 2. That a first device detects a state of a user side port of the first device means that the leaf 1 detects a state of U1, or the leaf 2 detects a state of U3. In the scenario shown in FIG. 3, the first device may be the leaf 1 or may be the leaf 2. That a first device detects a state of a user side port of the first device means that the leaf 1 detects states of U1 and U2, or the leaf 2 detects states of U3 and U4.

402. When each user side port of the first device is in a usable state, the first device removes a port of a peer-link of the first device from a broadcast domain.

The peer-link connects the first device and the second device. That the first device removes a port of a peer-link of the first device from a broadcast domain means that after receiving traffic, the first device no longer sends the traffic to the port of the peer-link.

In an embodiment, if the private line service is a remote private line service, because an access network device in the remote private line service at most supports one user side port, if detecting that one user side port is up, the access network device determines that the user side port is up.

In an embodiment, if the private line service is a local private line service, because an access network device in the local private line service at most supports two user side ports, if detecting that the two user side ports are both up, the access network device determines that the user side ports are up.

Descriptions are provided with reference to FIG. 2 and FIG. 3. In the scenario shown in FIG. 2, on the leaf 1 device, if detecting that U1 is up, the leaf 1 removes P1 from the broadcast domain; or on the leaf 2 device, if detecting that U3 is up, the leaf 2 removes P2 from the broadcast domain. In the scenario shown in FIG. 3, on the leaf 1 device, if detecting that U1 and U2 are both up, the leaf 1 removes P1 from the broadcast domain; or on the leaf 2 device, if detecting that U3 and U4 are both up, the leaf 2 removes P2 from the broadcast domain. That the leaf 2 enables P2 to exit the broadcast domain means that after traffic enters the leaf 2, the leaf 2 no longer duplicates the traffic to the P2 port.

In the method 400, in a normal case, that is, when the user side ports of the access network device are up, the first device or the second device removes the port of the peer-link from the broadcast domain. In this case, neither traffic sent from a user side to a network side or sent from a network side to a user side in the remote private line service, nor traffic sent from a user side to another user side in the local private line service passes through the port of the peer-link, so that traffic on the port of the peer-link is reduced, bandwidth pressure of the peer-link is reduced, and deployment of the private line service is optimized.

It can be learned from the method 400 that the state of the user side port may include a usable state and an unusable state. In addition, in some embodiments, for example, in the remote private line service, the network side port of the access network device may be faulty. The following separately describes the usable state or the unusable state of the user side port, and the unusable state of the network side port.

A first case: A user side port of the access network device is faulty.

Figure 5:
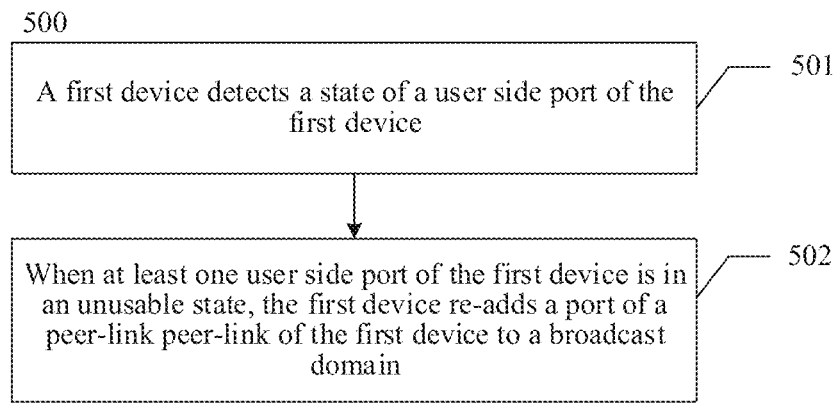
FIG. 5 is a schematic flowchart of a method 500 for configuring a private line service according to an embodiment of this application.

FIG. 5 is a schematic flowchart of a method 500 for configuring a private line service according to an embodiment of this application.

As shown in FIG. 5, the method 500 for configuring a private line service in this embodiment of this application may include the following steps:

501. A first device detects a state of a user side port of the first device.

The first device is an access network device directly connected to a first host, the first host accesses the user side port of the first device and a user side port of a second device by using a multi-chassis link bundling technology, the second device is an access network device directly connected to the first host, and the first device is different from the second device. The user side port of the first device and the user side port of the second device are located in a same bridge domain BD. The host may be a server, or may be a VM run on a server. The state of the user side port includes a usable state (up) and an unusable state (down).

The method 500 may be applicable to the scenario shown in FIG. 2 or FIG. 3. In the scenario shown in FIG. 2, the first device may be the leaf 1 or may be the leaf 2. That a first device detects a state of a user side port of the first device means that the leaf 1 detects a state of U1, or the leaf 2 detects a state of U3. In the scenario shown in FIG. 3, the first device may be the leaf 1 or may be the leaf 2. That a first device detects a state of a user side port of the first device means that the leaf 1 detects states of U1 and U2, or the leaf 2 detects states of U3 and U4.

502. When at least one user side port of the first device is in an unusable state, the first device re-adds a port of a peer-link of the first device to a broadcast domain.

In an embodiment, if the private line service is a remote private line service, because an access network device in the remote private line service at most supports one user side port, if detecting that one user side port is down, the access network device determines that the user side port is in an unusable state.

In an embodiment, if the private line service is a local private line service, because an access network device in the local private line service at most supports two user side ports, if detecting that either of the two user side ports is down, the access network device determines that the user side ports are in an unusable state.

Descriptions are provided with reference to FIG. 2 and FIG. 3. In the scenario shown in FIG. 2, when the leaf 1 detects that U1 is faulty, the leaf 1 re-adds P1 to the broadcast domain; or when the leaf 2 detects that U3 is faulty, the leaf 2 re-adds P2 to the broadcast domain. In the scenario shown in FIG. 3, when the leaf 1 detects that U1 or U2 is faulty, the leaf 1 re-adds P1 to the broadcast domain; or when the leaf 2 detects that U3 or U4 is faulty, the leaf 2 re-adds P2 to the broadcast domain.

A traffic forwarding process is analyzed with reference to the scenario shown in FIG. 2. Traffic that enters the leaf 1 through the network side port N1 of the leaf 1 is duplicated to P1. Further, a network side packet that enters the leaf 1 through N1 is decapsulated, then sent to P1, and sent to P2 on the leaf 2 through the peer-link. The U1 port on the leaf 1 is faulty, and the U3 port is no longer a dual-homing port. Therefore, P2 and U3 are no longer unidirectionally isolated, and the leaf 2 can send the traffic to the host 1 through U3. Because U1 is faulty, traffic sent by the host 1 to the network side can be sent by the host 1 to the leaf 2 through U3. In this case, U3 is up, so that the leaf 2 removes P2 from the broadcast domain, the leaf 2 no longer duplicates the traffic to P2, the leaf 2 duplicates the traffic to N2, and sends the traffic to the network side through N2.

In the scenario shown in FIG. 3, assuming that the leaf 1 detects that U1 is faulty, the leaf 1 adds the port P1 of the peer-link to the broadcast domain. Traffic sent by the host 2 to the host 1 can be sent to U2 and U4. Traffic sent by the host 2 to U4 can be locally forwarded. That is, the leaf 2 duplicates the traffic to U3, and U3 sends the traffic to the host 1. Traffic sent by the host 2 to U2 can be sent to P2 on the leaf 2 through P1 on the leaf 1. The U1 port on the leaf 1 is faulty, and the U3 port is no longer a dual-homing port. Therefore, P2 and U3 are no longer unidirectionally isolated, and the leaf 2 can send the traffic to the host 1 through the U3 port. Because U1 is faulty, traffic sent by the host 1 to the host 2 can be sent by the host 1 to the leaf 2 through U3. The leaf 2 then duplicates the traffic to U4, and sends the traffic to the host 2.

The method 500 resolves a problem that the user side port is faulty in the remote private line service or the local private line service, and reduces traffic on the port of the peer-link, reduces bandwidth pressure of the peer-link, and optimizes deployment of the private line service.

The method 400 and the method 500 describe the usable state and the unusable state of the user side port in the remote private line service and the local private line service. The remote private line service may further include a case in which the network side port of the first device or that of the second device is faulty, and the case is described in the following.

A second case: The network side port of the access network device is faulty.

Figure 6:
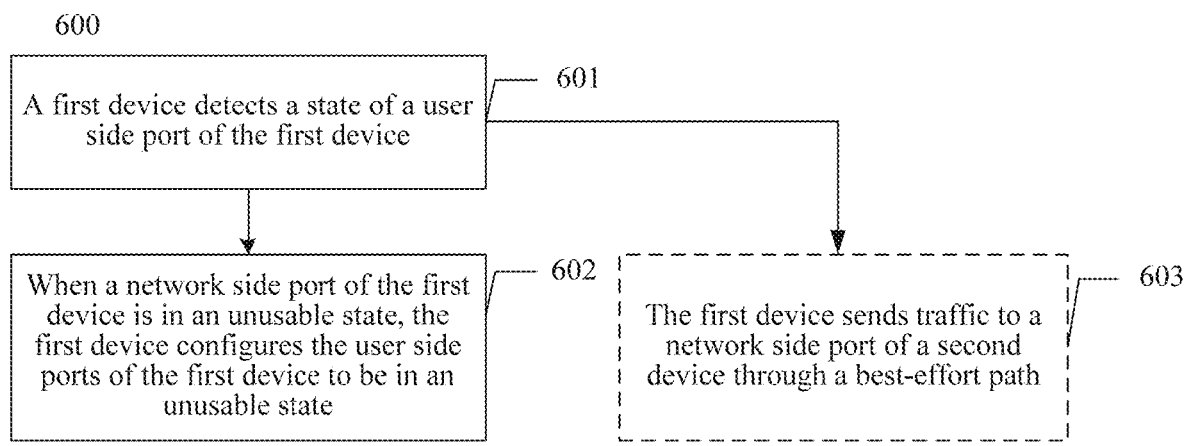
FIG. 6 is a schematic flowchart of a method 600 for configuring a private line service according to an embodiment of this application.

FIG. 6 is a schematic flowchart of a method 600 for configuring a private line service according to an embodiment of this application.

As shown in FIG. 6, the method 600 for configuring a private line service in this embodiment of this application may include the following steps:

601. A first device detects a state of a network side port of the first device.

The first device is an access network device directly connected to a first host, the first host accesses a user side port of the first device and a user side port of a second device by using a multi-chassis link bundling technology, the second device is an access network device directly connected to the first host, and the first device is different from the second device. The user side port of the first device and the user side port of the second device are located in a same bridge domain BD. The host may be a server, or may be a VM run on a server. The state of the network side port includes a usable state (e.g., up) and an unusable state (e.g., down).

The method 600 may be applicable to the scenario shown in FIG. 2. In the scenario shown in FIG. 2, the first device may be the leaf 1 or may be the leaf 2. That a first device detects a state of a network side port of the first device means that the leaf 1 detects a state of N1, or the leaf 2 detects a state of N2.

In the scenario shown in FIG. 2, that the first device detects that the network side port of the first device is faulty means that the leaf 1 detects that the port N1 of the leaf 1 is faulty, or the leaf 2 detects that the port N2 of the leaf 2 is faulty.

602. When the network side port of the first device is in an unusable state, the first device configures the user side port of the first device to be in an unusable state.

After detecting that the network side port of the first device is faulty, the first device configures an uplink port to be faulty, and shuts down access of a downlink port. In the scenario shown in FIG. 2, if detecting that the port N1 of the leaf 1 is faulty, the leaf 1 shuts down access of the downlink port U1. After the access of the downlink port U1 is shut down, traffic sent by the host 1 to the network side can enter the leaf 2 only through U3, and the leaf 2 then duplicates the traffic to the network side port N2 of the leaf 2. Because the user side port U3 of the leaf 2 is in a usable state, the leaf 2 removes the P2 port from the broadcast domain. That is, traffic that enters the leaf 2 is no longer duplicated by the leaf 2 to the P2 port. Therefore, traffic on the port of the peer-link is reduced, and bandwidth pressure of the peer-link is reduced.

In an embodiment, to resolve a problem that the network side port of the first device is faulty, after the first device determines that the network side port of the access network device is faulty, the method 600 may further include:

603. The first device sends the traffic to a network side port of the second device through an escape path.

After detecting that the user side port or the network side port is faulty, the first device can automatically start up the escape path, and sends the traffic to the network side port of the second device through the escape path. The escape path may be a predefined another peer-link physical link other than the peer-link described in step 602, or may be the peer-link physical link described in step 602. For clear description, the peer-link in step 602 is referred to as a first physical link, a port that is on the leaf 1 and that is connected to the first physical link is referred to the P1 port, an escape port on the leaf 1 is referred to as P1', a port that is on the leaf 2 and that is connected to the first physical link is referred to the P2 port, an escape port on the leaf 2 is referred to as P2', the predefined another peer-link is referred to as a second physical link, a port that is on the leaf 1 and that is connected to the second physical link is referred to a P3 port, and a port that is on the leaf 2 and that is connected to the second physical link is referred to the P4 port. In the scenario shown in FIG. 2, traffic sent by the host 1 enters the leaf 1 through U1. If the first device detects that the network side port N1 of the first device is faulty, the leaf 1 can send the traffic to the second device through the escape path, that is, can send the traffic to the leaf 2 in FIG. 2 through P1' and the first physical link. In other words, when the user side port of the leaf 1 is in a usable state, the P1 port is removed from the broadcast domain. However, after detecting that the network side port of the first device is faulty, the leaf 1 can start up the escape path. In this case, the P1' port is in a usable state, and the leaf 1 can duplicate the traffic to the P1' port and send the traffic to the leaf 2 through the first physical link or the second physical link. Alternatively, after detecting that the network side port of the first device is faulty, the leaf 1 sends the traffic to the leaf 2 through the P3 port and the second physical link. The leaf 2 forwards the traffic to the network side through the network side port N2 by using layer 3 forwarding. Because N1 is faulty, traffic sent from the network side can be sent to the second device through the network side port of the second device, and then sent to the host 1 through the dual-homing port U3 of the host 1 on the second device.

In the method 600, in a scenario in which the network side port of the first device is faulty, after determining that the network side port of the access network device is faulty, the first device can configure the user side port of the first device to be in an unusable state. In this case, traffic sent from the user side to the network side enters the second device through a dual-homing port of the host 1 on the second device, and the second device sends the traffic to the network side through the network side port of the second device. Because N1 is faulty, traffic sent from the network side to the user side can be sent to the second device through the network side port of the second device, and then sent to the host 1 through the dual-homing port of the host 1 on the second device. Alternatively, after the first device determines that the network side port of the access network device is faulty, traffic sent from the host 1 to the network side can be sent to the network side through the escape path.

For a scenario in which a user side device is dual-homed to the network the method 400 to the method 600 describe the method for configuring the remote private line service and the local private line service in a normal case and in a faulty scenario. The following describes a scenario in which the user side device is single-homed to the network.

Figure 7:
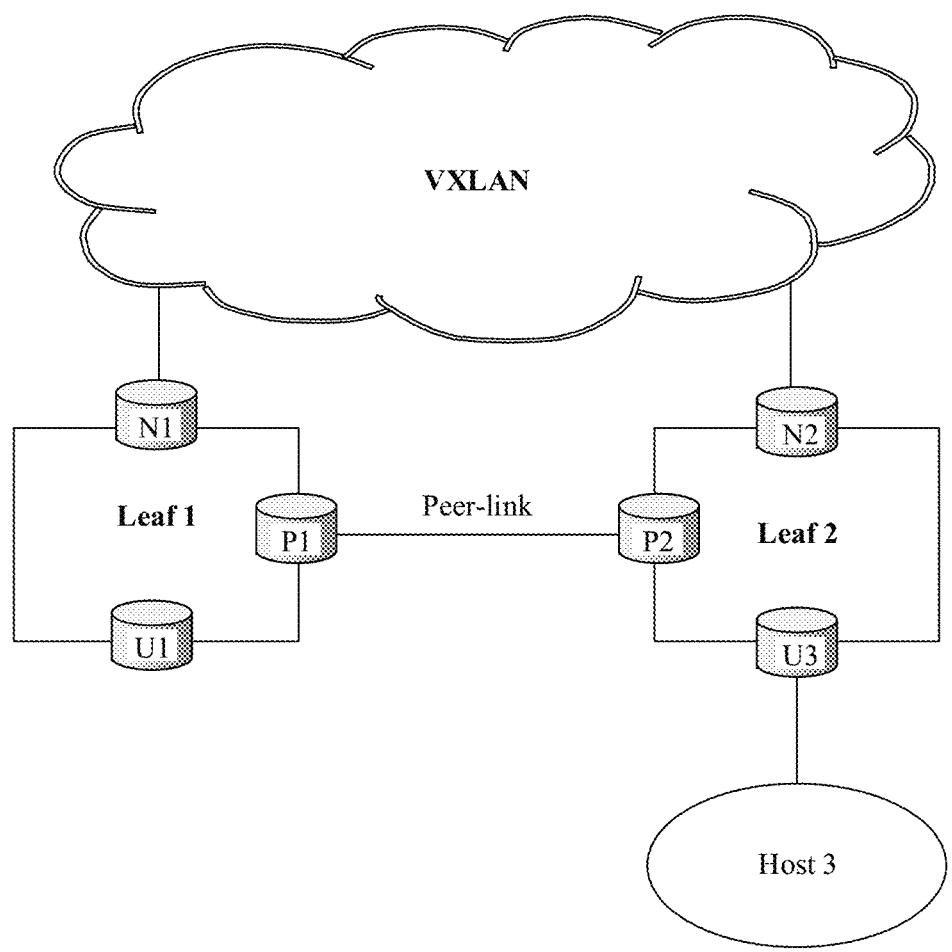
FIG. 7 is a schematic diagram of networking of a single-homing access VXLAN remote private line service according to an embodiment of this application.

To ensure network stability and reliability of the data center, a plurality of spine devices and leaf devices are usually disposed in the network architecture for backup and error tolerance. As shown in FIG. 1, one host is connected to a plurality of leaf devices, and one leaf device is connected to a plurality of spine devices. However, in some scenarios, one host can be merely connected to one leaf device. As shown in FIG. 7, in the VXLAN remote private line service, a host 2 is single-homed to the network. The leaf device is configured to forward a communication packet between the host to which the leaf device is connected and another network unit (such as another host). The leaf 1 and the leaf 2 establish a connection through a peer-link, and the peer-link is used for negotiation of packet exchange and transmission of some traffic. Host to which the leaf device is connected: A host may be a server, or may be a VM run on a server. Usually, each server can include one virtual switch and a plurality of VMs. In the remote private line service, one leaf device at most supports one user side port and one network side port. For example, the leaf 1 in FIG. 7 at most supports one user side port U1 and one network side port N1, and the leaf 2 at most supports one user side port U3 and one network side port N2. In the embodiments of this application, N1 and N2 are network side ports of a same VXLAN tunnel.

Figure 8:
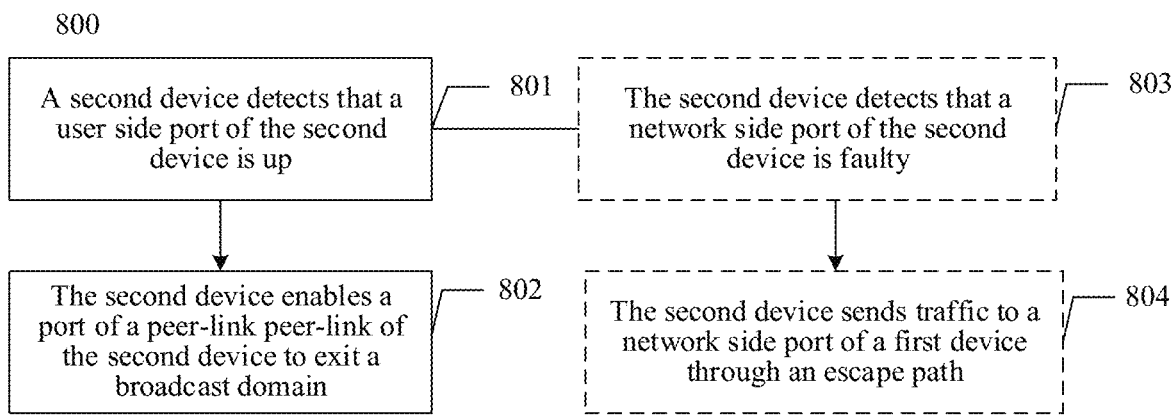
FIG. 8 is a schematic flowchart of a method 800 for configuring a private line service according to an embodiment of this application.

FIG. 8 is a schematic flowchart of a method 800 for configuring a private line service according to an embodiment of this application.

As shown in FIG. 8, the method 800 for configuring a private line service in this embodiment of this application may include the following steps:

801. A second device detects that user side ports of the second device are up.

The method 800 may be applicable to the scenario shown in FIG. 7. In the scenario shown in FIG. 7, on a leaf 1 device, the leaf 1 detects that U1 is up; and on a leaf 2 device, the leaf 2 detects that U3 is up.

802. The second device removes a port of a peer-link of the second device from a broadcast domain.

If detecting that the user side ports of the second device are up, the second device removes the port of the peer-link of the second device from the broadcast domain. In the scenario shown in FIG. 7, if detecting that U2 is up, the leaf 2 removes P2 from the broadcast domain.

In the scenario shown in FIG. 7, when traffic sent by the host 3 to a network side enters the leaf 2 through U3, if the detecting that U3 is up, the leaf 2 removes P2 from the broadcast domain. Because P2 exits the broadcast domain, the leaf 2 no longer duplicates the traffic to P2. Instead, the leaf 2 sends the traffic sent by the host 3 to an N2, and sends the traffic to the network side through N2. Traffic sent from the network side to the host 3 may pass through N1, or may pass through N2. When the traffic sent from the network side to the host 3 passes through N1, the leaf 1 adds P1 to the broadcast domain because the host 3 does not have an access side port on the leaf 1. In this way, traffic sent from the network side through N1 can be sent to the leaf 2 through P1, and then sent to the host 3 through U3. When the traffic sent from the network side to the host 3 passes through N2, the leaf 2 can directly send the traffic to the host 3 through U3. In this case, U3 is up on the leaf 2, so that the leaf 2 removes P2 from the broadcast domain, and traffic sent from the network side to the user side is no longer duplicated to P2.

In an embodiment, the method 800 may further include

803. The second device detects that a network side port of the second device is faulty.

804. The second device sends the traffic to a network side port of the first device through an escape path.

After detecting that the network side port is faulty, the second device can send the traffic to the network side port of the first device through the escape path. It should be noted that the escape path may also be referred to as a backup path. For example, in the scenario shown in FIG. 7, traffic sent by the host 3 enters the leaf 2 through U3. If the leaf 2 detects that the network side port N2 of the leaf 2 is faulty, the leaf 2 can send the traffic to the leaf 1 through the escape path. The leaf 1 forwards the traffic to the network side through the network side port N1 by using layer 3 forwarding. Because N2 is faulty, traffic sent by the network side can be sent to the leaf 1 through the network side port N1 of the leaf 1, the leaf 1 then sends the traffic to the leaf 2 through the escape path, and the leaf 2 finally sends the traffic to the host 3 through U3.

In the method 800, in a normal case, that is, the user side ports of the access network device are up, the access network device removes the port of the peer-link from the broadcast domain. In this case, neither traffic sent from the user side to the network side nor traffic sent from the network side to the user side in the remote private line service passes through the port of the peer-link, so that traffic on the port of the peer-link is reduced, and deployment of the private line service is optimized. In addition, when the network side port of the access network device is faulty, through the escape path, traffic on the user side may be sent to the network side or traffic on the network side may be sent to the user side. In a scenario in which the user side device is single-homed to the network, by detecting a state of the user side port, the port of the peer-link is flexibly added to or removed from the broadcast domain, traffic on the peer-link port is reduced, and bandwidth pressure of the peer-link is reduced.

The foregoing mainly describes, from the perspective of interaction between devices, the solutions provided in the embodiments of this application. It may be understood that to implement the foregoing functions, the foregoing first device includes corresponding hardware structures and/or software modules for performing various functions. A person skilled in the art should be easily aware that this application can be implemented by hardware or in a form of a combination of hardware and computer software with reference to modules and algorithm steps of examples described in the embodiments disclosed in this specification. Whether a function is performed by hardware or computer software driving hardware depends on particular applications and design constraints of the technical solutions. A person skilled in the art may use different methods to implement the described functions for the particular applications, but it should not be considered that the implementation goes beyond the scope of this application.

From a perspective of a hardware structure, the first device in the method 400 to the method 600 and the second device in the method 800 may be implemented by one entity device, or may be mutually implemented by a plurality of entity devices, or may be a logical functional module in an entity device. The embodiments of this application constitute no limitations herein.

Figure 9:
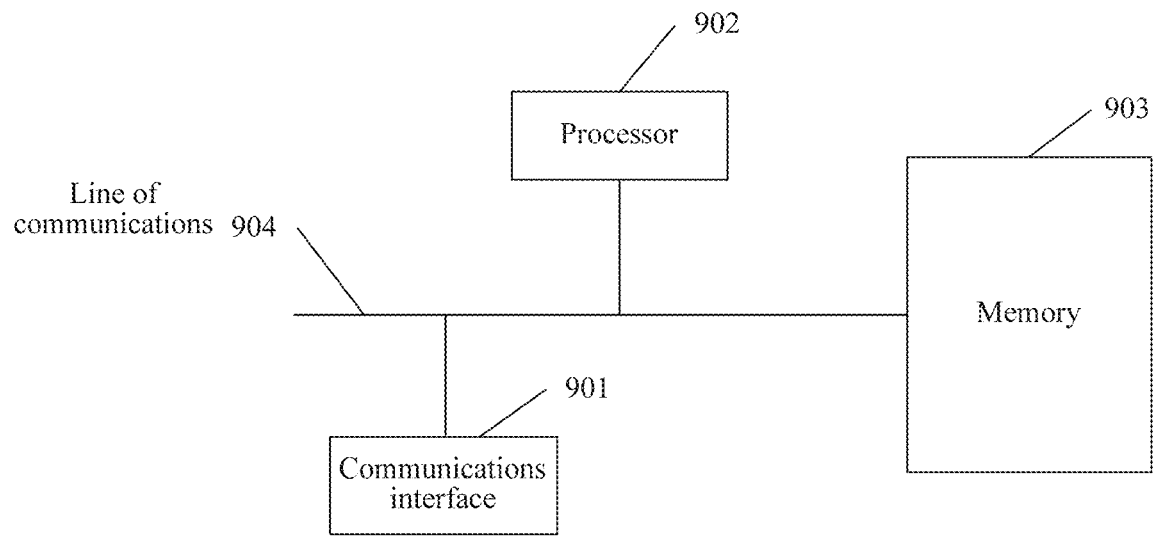
FIG. 9 is a schematic diagram of a hardware structure of a communications device according to an embodiment of this application.

For example, the first device can be implemented by using the communications device in FIG. 9. FIG. 9 is a schematic diagram of a hardware structure of a communications device according to an embodiment of this application. The communications device includes: a communications interface 901 and a processor 902, and may further include a memory 903.

The communications interface 901 may use any apparatus of a transceiver type, configured to communicate with another device or a communications network, such as an Ethernet, a radio access network (RAN), or a wireless local area network (WLAN). In the embodiments of this application, for clear description of the solutions, the communications interface may be further divided into user side ports, a network side port, an escape port, and a port of a peer-link. The user side port may further include a first port and a second port.

The processor 902 includes, but is not limited to, one or more of a central processing unit (CPU), a network processor (NP), an application-specific integrated circuit (ASIC), or a programmable logic device (PLD). The foregoing PLD may be a complex programmable logic device (CPLD), a field-programmable gate array (FPGA), generic array logic (GAL), or any combination thereof. The processor 902 is responsible for lines of communications 904 and general processing, and may further provide various functions, including timing, a function of a peripheral interface, voltage regulation, power management, and another control function. The memory 903 may be configured to store data used by the processor 902 when the processor 902 performs an operation.

The memory 903 may be a read-only memory (ROM) or another type of static storage device that can store static information and a static instruction; or a random access memory (RAM) or another type of dynamic storage device that can store information and an instruction; or may be an electrically erasable programmable read-only memory (EEPROM), a compact disc read-only memory (CD-ROM) or another compact disc storage medium, optical disc storage medium (including a compact disc, a laser disc, an optical disc, a digital versatile disc, a Blu-ray disc, or the like), magnetic disk storage medium or another magnetic storage device, or any other medium that can be configured to carry or store expected program code in a form of an instruction or a data structure and that is accessible by a computer, but is not limited thereto. The memory may exist independently, and is connected to the processor 902 through the lines of communications 904. Alternatively, the memory 903 may be integrated with the processor 902. The memory 903 may also be integrated in the processor 902. If the memory 903 and the processor 902 are mutually independent devices, the memory 903 is in communication with the processor 902. For example, the memory 903 may communicate with the processor 902 through the lines of communications. The network interface 901 may communicate with the processor 902 through the lines of communications, or the network interface 901 may be directly connected to the processor 902.

The lines of communications 904 may include any quantity of interconnected buses and bridges, and connect together various circuits that include one or more processors 902 represented by the processor 902 and a memory represented by the memory 903. The lines of communications 904 may further connect together various other circuits such as a peripheral device, a voltage stabilizer, and a power management circuit. These are known in the art, and therefore are no longer further described in this application.

In an embodiment, the communications device includes: a processor, and a user side port coupled to the processor, where the processor is configured to detect a state of the user side port of the first device, where the first device is an access network device directly connected to a first host, the first host accesses the user side port of the first device and a user side port of a second device by using a multi-chassis link bundling technology, the second device is an access network device directly connected to the first host, the first device is different from the second device, and the user side port of the first device and the user side port of the second device are located in a same bridge domain BD; and the processor is further configured to: when each user side port of the first device is in a usable state, remove a port of a peer-link of the first device from a broadcast domain, where the peer-link connects the first device and the second device.

In an embodiment, the processor is further configured to: when at least one user side port of the first device is in an unusable state, re-add the port of the peer-link of the first device to the broadcast domain.

In an embodiment, the processor is further configured to: when a network side port of the first device is in an unusable state, configure the user side ports of the first device to be in an unusable state, where traffic from the first host to a network side is sent to a network side port of the second device through the user side ports of the second device, and the network side port of the first device and the network side port of the second device are located in the BD, and the network side port of the first device is coupled to the processor.

In an embodiment, the user side ports are configured to: when a network side port of the second device is in an unusable state, receive traffic sent by the first host; and the processor is further configured to duplicate traffic that is sent by the first host and that is received by the user side port to a network side port of the first device, where the network side port of the first device and the network side port of the second device are located in the BD.

In an embodiment, the communications device may further include: an escape port, coupled to the processor and the user side ports, and configured to: when the network side port of the first device is in an unusable state, send traffic that is sent by the first host to the network side and that is received by the user side port to the network side port of the second device.

In an embodiment, the user side port of the first device includes a first port and a second port, the user side port of the second device includes a third port and a fourth port, and when the first port and the second port are both in a usable state, the first port is configured to receive traffic sent by the first host to a second host, where the first host accesses the first port and the third port by using the multi-chassis link bundling technology; and the second port is configured to send the traffic to the second host, where the second host accesses the second port and the fourth port by using the multi-chassis link bundling technology, and the traffic sent by the first host does not pass through the peer-link.

In an embodiment, the user side port of the first device includes a first port and a second port, the user side port of the second device includes a third port and a fourth port, the first host accesses the first port and the third port by using the multi-chassis link bundling technology, a second host accesses the second port and the fourth port by using the multi-chassis link bundling technology, and when the first port is in a usable state and the second port is in an unusable state, the first port is configured to receive traffic sent by the first host to the second host; and the first device further includes: a port of the peer-link, where the port of the peer-link is configured to send the traffic to the second host.

In an embodiment, the user side port of the first device includes a first port and a second port, the user side port of the second device includes a third port and a fourth port, the first host accesses the first port and the third port by using the multi-chassis link bundling technology, a second host accesses the second port and the fourth port by using the multi-chassis link bundling technology, and when the first port is in an unusable state and the second port is in a usable state, the second port is further configured to receive traffic sent by the second host to the first host; and the port of the peer-link is further configured to send the traffic to the third port of the second device.

Figure 10:
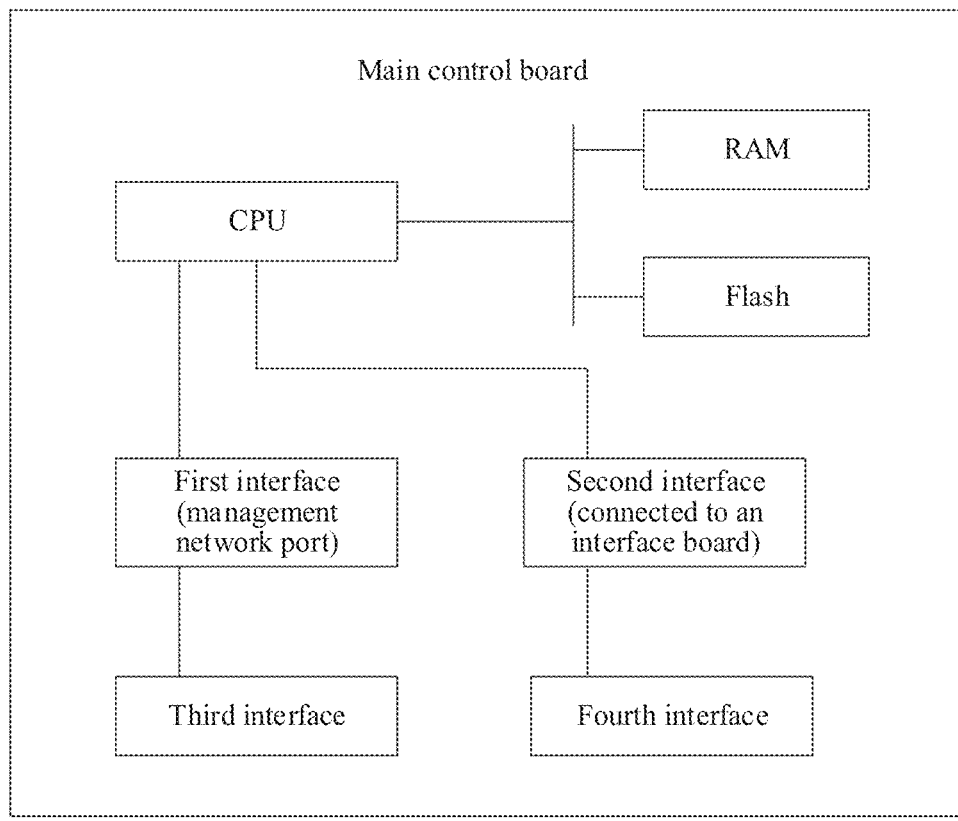
FIG. 10 is a schematic diagram of a hardware structure of a main control board of a communications device according to an embodiment of this application.

For example, FIG. 10 is a schematic diagram of a hardware structure of a main control board of a communications device according to an embodiment of this application. As shown in FIG. 10, a CPU is control unit of the main control board of the communications device, a program run and a parameter statically configured are saved in a flash memory, and data and code executed when the program is run are placed in a RAM connected to the CPU. The CPU is connected to a communications interface. For example, the communications interface may be divided into a first interface, a second interface, a third interface, and a fourth interface. The first interface may be a management network port, the second interface may be configured to connect to an interface board of the communications device, and the third interface and the fourth interface are equivalent to the first port, the second port, the third port, and the fourth port in the methods 400 to 600, and the method 800. It should be noted that the first interface, the second interface, the third interface, and the fourth interface are merely used as examples to describe a usage of the interface, and do not constitute limitations on a quantity of communications interfaces on the communications device.

Figure 11:
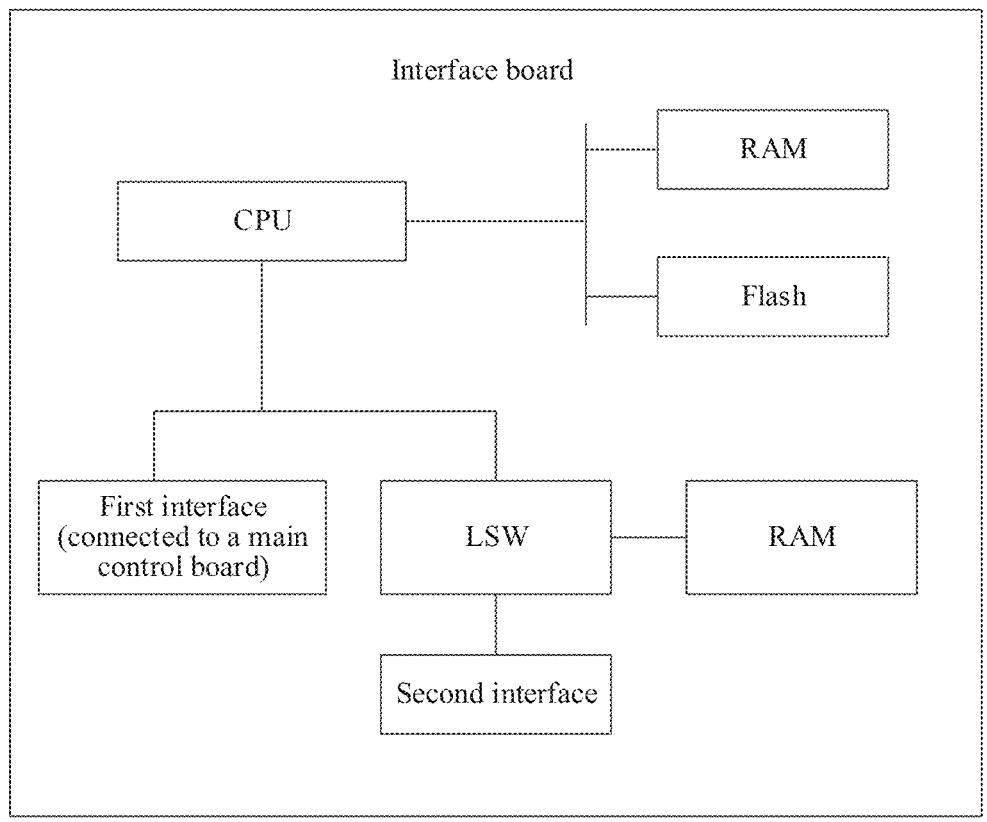
FIG. 11 is a schematic diagram of a hardware structure of an interface board of a communications device according to an embodiment of this application.

For example, FIG. 11 is a schematic diagram of a hardware structure of an interface board of a communications device according to an embodiment of this application.

A CPU is a control unit of the interface board of the communications device, a program run and a parameter statically configured are saved in a flash, and data and code executed when the program is run are placed in a RAM connected to the CPU. The CPU controls an Ethernet switching chip (e.g., LAN switch, LSW) for performing initialization, delivering a service entry, sending and receiving a protocol packet, and various interruptions, for example, configuring a port to be in a usable state and in an unusable state. The LSW may have an external RAM for storing forwarded packet content, so that some scenarios in which the LSW chip does not have enough internal cache can be handled. For example, the communications interface may be divided into a first interface, and a second interface. The first interface is configured to connect to a main control board, and the second interface is equivalent to the first port, the second port, the third port, and the fourth port in the methods 400 to 600, and the method 800. It should be noted that the first interface and the second interface are merely used as examples to describe a usage of the interface, and do not constitute limitations on a quantity of communications interfaces on the communications device.

In the embodiments of this application, functional modules in the first device may be divided according to the foregoing method example. For example, the functional modules may be divided corresponding to the functions. Alternatively, two or more functions may be integrated into one processing module. The foregoing integrated module may be implemented in a form of hardware, or may be implemented in a form of a software functional module. It should be noted that module division in the embodiments of this application is an example and is merely logical function division. During actual implementation, there may be another division manner.

Figure 12:
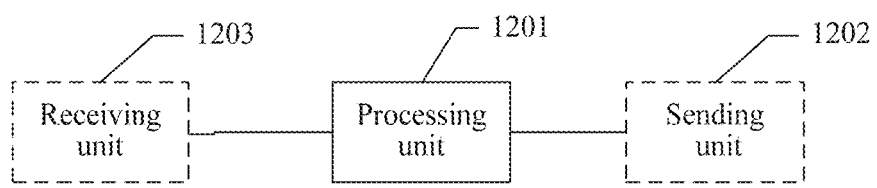
FIG. 12 is a schematic structural diagram of a first device according to an embodiment of this application.

For example, when functional modules are divided in an integrated manner, FIG. 12 is a schematic structural diagram of a first device.

As shown in FIG. 12, the first device provided in the embodiments of this application may include a processing unit 1201 and a sending unit 1202.

The processing unit 1201 is configured to execute step 401 in the foregoing method 400, step 402 in the foregoing method 400, step 501 in the foregoing method 500, step 502 in the foregoing method 500, step 602 in the foregoing method 600, step 601 in the foregoing method 600, step 801 in the foregoing method 800, step 803 in the foregoing method 800, and step 802 in the foregoing method 800.

In an embodiment, the first device may further include the sending unit 1202, configured to execute step 501 in the foregoing method 500, step 502 in the foregoing method 500, step 603 in the foregoing method 600, step 802 in the foregoing method 800, and step 804 in the foregoing method 800.

In an embodiment, the first device may further include a receiving unit 1203, configured to execute step 501 in the foregoing method 500, step 502 in the foregoing method 500, and step 802 in the foregoing method 800.

In the foregoing embodiment, the first device is represented by dividing the functional modules in an integrated manner. Certainly, the embodiments of this application may further divide various functional modules of the first device corresponding to various functions, and the embodiments of this application constitute no limitations herein.

In an embodiment, in the embodiments of this application, a chip system is provided, and the chip system includes a processor configured to support the first device in implementing the method for configuring a private line service. In a possible design, the chip system further includes a memory. The memory is configured to save a program instruction and data that are necessary to a head node. The chip system may include a chip, or may include a chip and another discrete member. The embodiments of this application constitute no limitations herein.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instruction is loaded and executed on a computer, the procedure or functions according to the embodiments of this application are all or partially performed. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (such as a coaxial cable, an optical fiber, or a digital subscriber line (DSL)) or wireless (such as infrared, radio, or microwave) manner. The computer-readable storage medium may be any usable medium that can be stored by a computer, or a data storage device, such as a server or a data center, integrating one or more usable mediums. The usable medium may be a magnetic medium (such as a soft disk, a hard disk, or a magnetic tape), an optical medium (such as a DVD), a semiconductor medium (such as a solid-state drive (SSD)), or the like.

A person of ordinary skill in the art may understand that all or some of the steps of the methods in the foregoing embodiments may be implemented by a program instructing relevant hardware. The program may be stored in a computer-readable storage medium. The storage medium may include: a ROM, a RAM, a magnetic disk, an optical disc, or the like.

The method for configuring a private line service, the first device, and the storage medium provided in the embodiments of this application are described in detail in the foregoing, and this specification applies examples to describe the principle and embodiments of this application. The foregoing descriptions of the embodiments are only intended to help understand the method and core idea of this application. In addition, to a person of ordinary skill in the art, changes can be made on the embodiments and application range according to the idea of this application. In conclusion, the content of the specification should not be understood as a limit to this application.

What is claimed is:

1. A method for configuring a private line service, comprising:
    detecting, by a first device, a state of each of a first user side port and a second user side port of the first device, wherein both the first user side port and the second user side port are in a bridge domain, and wherein the state of each user side port includes a first state indicating that the user side port is up, and a second state indicating that the user side port is down, wherein the first device is an access network device directly connected to a first host, wherein the first host is directly coupled to a second device, wherein the second device is an access network device that comprises a third user side port and a fourth user side port, wherein the first device and the second device are different and are connected by a peer-link of the first device; and
    in response to detecting that each of the first user side and the second user side port of the first device in the bridge domain is in the first state indicating that the user side port is up,
        removing, by the first device, a port of the peer-link of the first device from a broadcast domain corresponding to the bridge domain,
        receiving, by the first device, traffic from the first host to a second host through the first user side port, wherein the first host accesses the first user side port and the third user side port by using a multi-chassis link bundling technology, and
        sending, by the first device, the traffic to the second host through the second user side port, wherein the second host accesses the second user side port and the fourth user side port by using the multi-chassis link bundling technology, and the traffic sent from the first host does not pass through the peer-link.

2. The method according to claim 1, further comprising:
    in response to detecting that at least one of the first user side port or the second user side port of the first device is in the second state, re-adding, by the first device, the port of the peer-link of the first device to the broadcast domain.

3. The method according to claim 1, wherein
    the private line service is a remote private line service, and
    the method further comprises:
    receiving, by the first device through at least one of the first user side port or the second user side port of the first device, traffic sent by the first host; and
    in response to detecting that a network side port of the second device is in a third state indicating that the network side port of the second device is down, sending, by the first device to a network side port of the first device, the received traffic sent by the first host.

4. The method according to claim 1, wherein
    the private line service is a remote private line service,
    the bridge domain comprises a network side port of the first device, and
    the method further comprises:
    in response to detecting that the network side port of the first device is in a third state indicating that the network side port is down, configuring, by the first device, at least one of the first user side port or the second user side port of the first device in the bridge domain to be in the second state, wherein traffic from the first host to a network side is sent to a network side port of the second device and through at least one of the third user side port or the fourth user side port of the second device.

5. The method according to claim 1, wherein
    the private line service is a remote private line service,
    the bridge domain comprises a network side port of the first device, and
    the method further comprises:
    in response to detecting that the network side port of the first device in the bridge domain is in a third state indicating that the network side port is down, sending, by the first device, received traffic from the first host to the network side to a network side port of the second device and through an escape path.

6. The method according to claim 1, wherein the private line service is a local private line service.

7. The method according to claim 2, wherein the private line service is a local private line service; wherein the method further comprises:
in response to detecting that the first user side port is in the first state and the second user side port is in the second state, receiving, by the first device through the first user side port, traffic sent by the first host to the second host; and
sending, by the first device, the traffic to the second host through the peer-link.

8. The method according to claim 1, wherein the private line service is a local private line service; wherein the method further comprises:
in response to detecting that the first user side port is in the second state and the second user side port is in the first state, receiving, by the first device through the second user side port, traffic sent by the second host to the first host; and
sending, by the first device, the traffic to the third user side port of the second device through the peer-link.

9. A first device for configuring a private line service in a virtual network, the first device comprising:
a processor;
one or two user side ports coupled to the processor, wherein the first device is an access network device directly connected to a first host, wherein the first host is directly coupled to a second device, wherein the second device is an access network device that comprises a third user side port and a fourth user side port, and wherein the first device and the second device are different and are connected by a peer-link of the first device; and
a memory coupled to the processor to store instructions, which when executed by the processor, cause the processor to perform operations, the operations including:
detecting a state of each of a first user side port and a second user side port of the first device, wherein both the first user side port and the second user side port are in a bridge domain, and wherein the state of each user side port includes a first state indicating that the user side port is up, and a second state indicating that the user side port is down; and
in response to detecting that each of the user side port and the second user side port of the first device in the bridge domain is in the first state indicating that the user side port is up,
removing a port of the peer-link of the first device from a broadcast domain corresponding to the bridge domain,
receiving traffic from the first host to a second host through the first user side port, wherein the first host accesses the first user side port and the third user side port by using a multi-chassis link bundling technology, and
sending the traffic to the second host through the second user side port, wherein the second host accesses the second user side port and the fourth user side port by using the multi-chassis link bundling technology, and the traffic sent from the first host does not pass through the peer-link.

10. The first device according to claim 9, wherein the operations further include:
in response to detecting that at least one of the first user side port or the second user side port of the first device is in the second state, re-adding the port of the peer-link of the first device to the broadcast domain.

11. The first device according to claim 9, further comprising:
a network side port coupled to the processor, wherein the bridge domain comprises the network side port,
wherein the operations further include:
in response to detecting that the network side port of the first device is in a third state indicating that the network side port is down, configuring at least one of the first user side port or the second user side port of the first device in the bridge domain to be in the second state, wherein traffic from the first host to a network side is sent to a network side port of the second device and through at least one of the third user side port or the fourth user side port of the second device.

12. The first device according to claim 9, wherein the operations further include:
receiving traffic sent by the first host through at least one of the first user side port or the second user side port of the first device; and
in response to detecting that a network side port of the second device is in a third state indicating that the network side port of the second device is down, duplicating the traffic sent from the first host to a network side port of the first device.

13. The first device according to claim 9, wherein the bridge domain comprises a network side port of the first device;
wherein the first device further comprises an escape port coupled to the processor and at least one of the first user side port or the second user side port; and
wherein the operations further include: in response to detecting that the network side port of the first device in the bridge domain is in a third state indicating that the network side port is down, sending traffic that is sent from the first host to a network side and received by the user side port and through a network side port of the second device.

14. The first device according to claim 9, wherein the private line service is a local private line service.

15. The first device according to claim 10, wherein the operations further include:
in response to detecting that the first user side port is in the first state and the second user side port is in the second state, receiving traffic sent from the first host to the second host through the first user side port; and
sending the traffic to the second host through the port of the peer-link.

16. The first device according to claim 9, wherein the operations further include:
in response to detecting that the first user side port is in the second state and the second user side port is in the first state, receiving traffic sent from the second host to the first host through the second user side port; and
sending the traffic to the third user side port of the second device through the port of the peer-link.

17. A communications system, comprising:
a first device; and
a second device that is different from the first device, and is connected to the first device by a peer-link of the first device;
wherein the first device is configured to:

detect a state of each of a first user side port and a second user side port of the first device, wherein both the first user side port and the second user side port are in a bridge domain, and wherein the state of each user side port includes a first state indicating that the user side port is up, and a second state indicating that the user side port is down, wherein the first device is an access network device directly connected to a first host, wherein the first host is directly coupled to a second device, wherein the second device is an access network device that comprises a third user side port and a fourth user side port; and in response to detecting that each of the first user side port and the second user side port of the first device in the bridge domain is in the first state indicating that the user side port is up,
- remove a port of the peer-link of the first device from a broadcast domain corresponding to the bridge domain,
- receive traffic from the first host to a second host through the first user side port, wherein the first host accesses the first user side port and the third user side port by using a multi-chassis link bundling technology, and
- send the traffic to the second host through the second user side port, wherein the second host accesses the second user side port and the fourth user side port by using the multi-chassis link bundling technology, and the traffic sent from the first host does not pass through the peer-link.

18. The communications system according to claim 17, wherein the first device is further configured to:
in response to detecting that at least one of the first user side port or the second user side port of the first device is in the second state, re-add the port of the peer-link of the first device to the broadcast domain.

19. The communications system according to claim 17, wherein the first device is further configured to:
receive traffic sent by the first host through at least one of the first user side port or the second user side port of the first device; and
in response to detecting that a network side port of the second device is in a third state indicating that the network side port of the second device is down, send the received traffic sent by the first host to a network side port of the first device.

20. The communications system according to claim 17, wherein the first device is further configured to:
in response to detecting that a network side port of the first device is in a third state indicating that the network side port is down, configure at least one of the first user side port or the second user side port of the first device in the bridge domain to be in the second state, wherein traffic from the first host to a network side is sent to a network side port of the second device and through at least one of the third user side port or the fourth user side port of the second device.

* * * * *